United States Patent

[11] 3,629,547

[72] Inventors Jack R. Kester;
Ray D. Multhaup; William R. Roberts;
Raymond L. Townsend; Kenneth A. Young,
all of Wichita, Kans.
[21] Appl. No. 9,623
[22] Filed Feb. 9, 1970
[45] Patented Dec. 21, 1971
[73] Assignee Tweco Products, Inc.
Wichita, Kans.

[54] SEMIAUTOMATIC WELDING APPARATUS
4 Claims, 9 Drawing Figs.
[52] U.S. Cl. ................................................... 219/130,
174/15 C, 219/136
[51] Int. Cl. ..................................................... P23k 9/00
[50] Field of Search ........................................... 174/15 C;
219/130, 136, 75, 74, 138; 339/177, 272

[56] References Cited
UNITED STATES PATENTS

| | | | |
|---|---|---|---|
| 2,512,707 | 6/1950 | Anderson | 219/75 |
| 3,196,249 | 7/1965 | Thostrup | 174/15 |
| 3,239,647 | 3/1966 | Irniger | 219/130 |
| 3,265,856 | 8/1966 | Cecil | 219/130 |
| 3,281,571 | 10/1966 | Gilmore | 219/130 |
| 3,433,882 | 3/1969 | Henriksen et al. | 219/136 X |
| 3,469,070 | 9/1969 | Bernard et al. | 219/130 |
| 3,510,623 | 5/1970 | Wolgast | 219/138 |
| 2,953,771 | 9/1960 | Kussy | 339/272 |

FOREIGN PATENTS

| 1,094,703 | 12/1967 | Great Britain | 219/130 |
|---|---|---|---|

*Primary Examiner*—J. V. Truhe
*Assistant Examiner*—George A. Montanye
*Attorney*—John H. Widdowson ABSTRACT: This invention is a welding apparatus operable to automatically provide an electrode surrounded by a shielding gas for welding through an arc-welding process. More particularly, this invention is a welding apparatus having a welding gun assembly connected through a cable assembly to a quick connector assembly which, in turn, is adapted to be inserted within a supply adapter assembly to transfer gas, welding wire, and electrical power to the welding gun assembly. Additionally, this invention relates to a welding apparatus operable to supply welding wire while having structural features (1) allowing for the ready disconnecting and connecting to a supply source, and (2) to maintain the gun assembly in a cool condition during welding operations; and (3) achieving lightweight features for ease of usage.

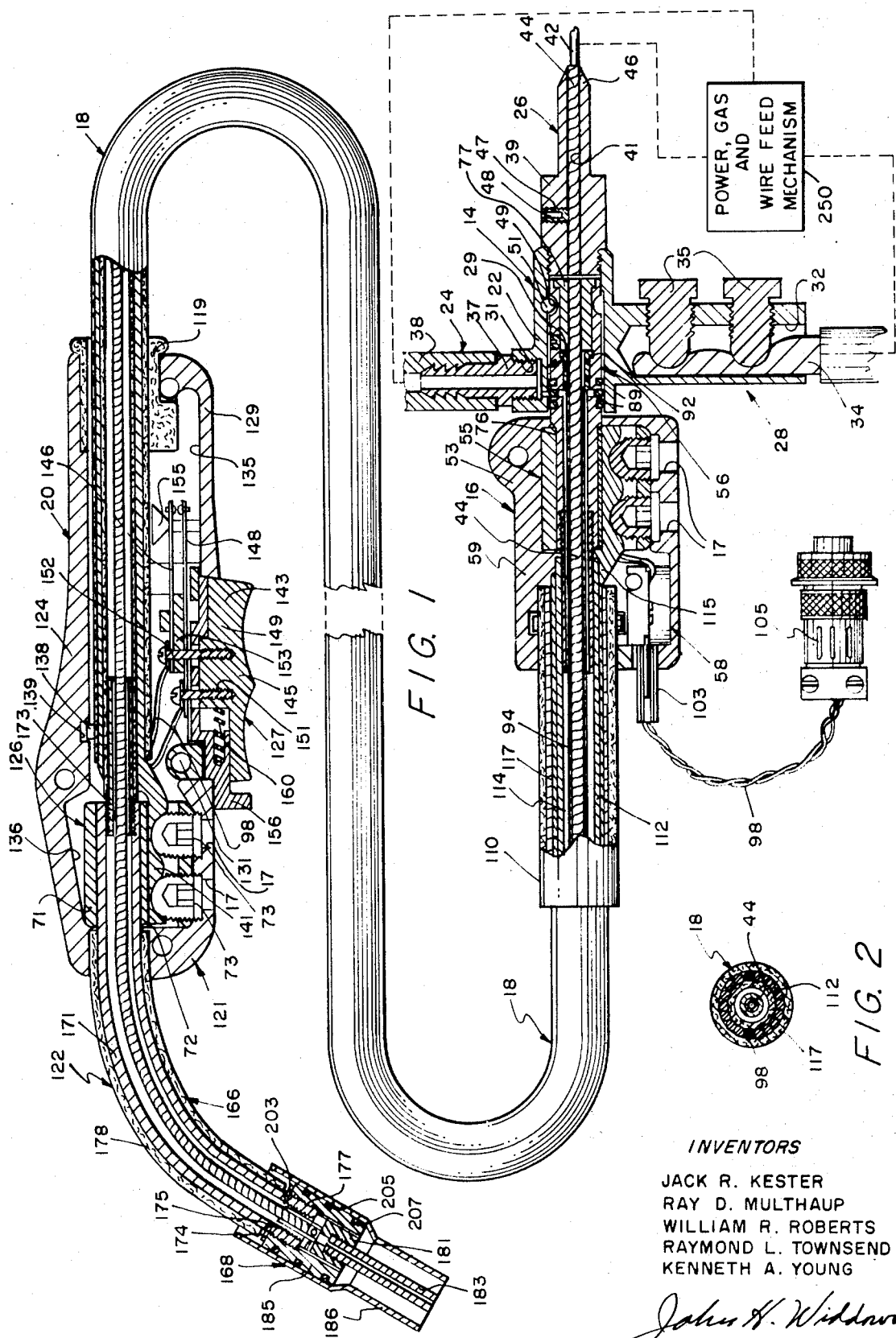

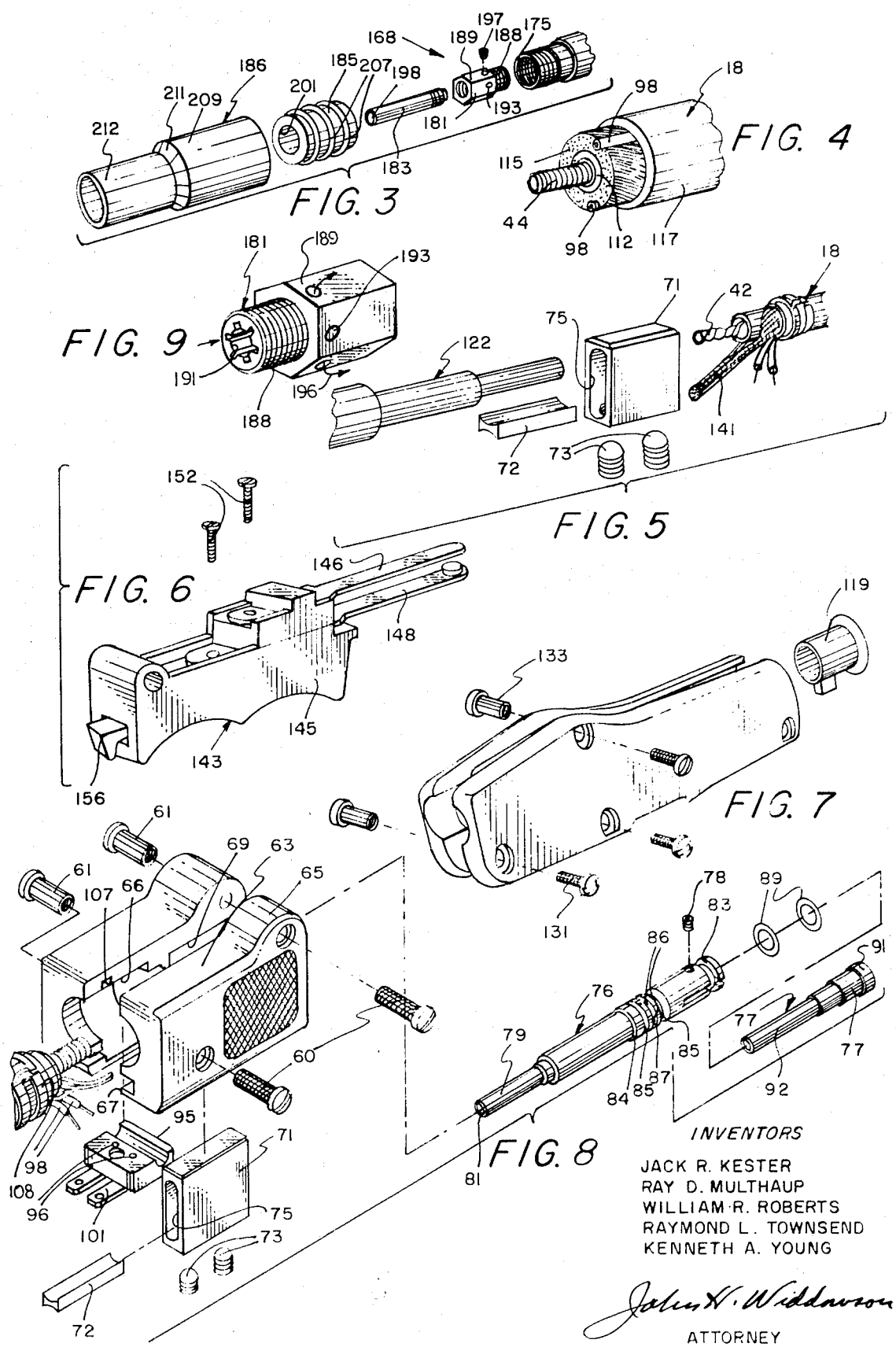

SEMIAUTOMATIC WELDING APPARATUS

Numerous types of devices are known to the prior art operable to supply a wire electrode into a welding zone through a gun structure and normally having a separate hose member for supplying a gas such as helium or argon to form a shield about a welding zone to prevent contamination. In such prior art structures, it has been found that separate controls are required to supply the required elements being (1) an electrical current, (2) a shielding gas, and (3) a welding wire electrode to the item being welded as such structures are bulky, inefficient, and require considerable additional effort on the part of the operator. Additionally, the prior art welding gun structures are difficult to connect and disconnect whereupon the operator tends to use one gun whereas the efficiency and economy would be achieved by substituting a proper welding gun to utilize the different size wire, current required, etc. Additionally, in some of the prior art structures, the electrical supply used is conducted in an efficient manner from the supply source to the welding tip of the welding gun structure which results in increased operating costs and poor arc characteristics with resultant inferior welding.

In one preferred embodiment of this invention, a semiautomatic welding apparatus is provided including (1) a supply adapter assembly operable to be connected to the gas, welding wire, and power cable supply sources through feed mechanisms which are standard in the art; (2) a quick connector assembly readily insertable into and connected to the supply adapter assembly and having a control wire connector assembly connected to the feed mechanisms for operation; (3) a cable assembly connected to the quick connector assembly and operable to convey gas, welding wire, electrical power supply, and a control circuit therethrough; and (4) a welding gun assembly secured to the outer end of the cable assembly having means thereon to supply the welding wire, gas and electrical power. The supply adapter assembly includes a main housing having portions thereon to receive a gas feed adapter, a wire feed adapter, and a power cable adapter thereto. The quick connector assembly includes a main connector housing provided with a control wire connector assembly and a cable connector assembly adapted to provide electrical continuity from a plug-in adapter plug portion to a conductor portion of the cable assembly. The control wire connector assembly is connected to the pair of control wires within the cable assembly. The connector housing is of an irregular shape having a hose clamp member mounted therein secured about one end of the cable assembly to prevent longitudinal movement. The cable assembly is provided with a central flexible welding wire conduit assembly which is removable and replaceable; a cable insulator and gas hose mounted about the wire conduit assembly; and electrical conductor cable mounted about the gas hose; a pair of the control wires mounted within individual insulation coverings and carried within the conductor cable; and an outer heavy insulation cover. Control wires are preferably spirally wound along with the conductor cable. The outer end of the cable assembly is mounted within the welding gun assembly and, more particularly, through a cable grommet member, the cable having its outer end secured by a hose clamp. The welding gun assembly includes a main handle assembly which, in turn, is connected at its outer end to a conductor and supply tube assembly. The handle assembly is provided with a cable connector assembly secured to one end of the conductor cable and having an actuator switch assembly connected to the control wires for momentary or locked position operation. The actuator switch assembly includes a main trigger assembly having an actuator portion movable inwardly to the closed condition to actuate the gas, the electrical power supply and the wire feed supply mechanisms on demand. The actuator switch assembly also has a portion which when moved rearwardly locks the trigger assembly in closed condition until released by reactuation of the trigger. The conductor and supply tube assembly includes an elongated tube assembly having its outer end secured to a nozzle assembly. The tube assembly includes a conductive tube member enclosed by an insulative cover. The tube member has a central bore to receive shielding gas and welding wire conduit with shielding gas flow around the welding wire conduit. The outer end of the tube assembly is provided with internal and external threads to receive the nozzle assembly thereon. More particularly, the nozzle assembly includes a gas diffuser member secured to the internal threads on the tube member; a contact tip secured to the diffuser member; a nozzle insulator member mounted on the external threads of the tube member and surrounding the diffuser member; and an outer nozzle member mounted about the insulator member in an adjustable manner. The gas diffuser member is provided with an outer preferably hexagonal surface with internal threads to receive a contact tip member therein. Additionally, the gas diffuser member is provided with a central bore to receive the outer end of the welding wire conduit. The central bore preferably having longitudinal grooves connecting to a plurality of radially extended openings to convey the gas outwardly to the inner wall of the surrounding nozzle insulator, then forward about the contact tip to provide the necessary shielding gas in the welding zone during operation. The nozzle member is placed over the insulator member and held thereon by preferably three retaining rings on the insulator for stability. It is noted that the welding apparatus is operable to supply gas and welding wire material and electrical power to an outer nozzle tip structure to provide for a shielded arc-welding process semiautomatically through the use of a lightweight control handle structure and a single cable assembly.

One object of this invention is to provide a semiautomatic welding apparatus overcoming the aforementioned disadvantages of the prior art structures.

One other object of this invention is to provide a welding apparatus provided with a welding gun assembly connectable through a cable assembly to a quick connector assembly which, in turn, is readily attached to a supply adapter assembly to supply welding wire, shielding gas, and electrical power supply on demand in a most efficient and effective manner.

Another object of this invention is to provide a welding apparatus providing for a quick connect and disconnect of control wires.

Still, one other object of this invention is to provide a welding apparatus having a cable assembly connectable to a welding gun assembly wherein the cable assembly is provided with a removable and replaceable central welding wire conduit assembly surrounded by a gas hose which also serves as an inner cable insulation which, in turn, is surrounded by a wound conductor cable having separately insulated control wires wound therewith and having an outer insulator cover, the total assembly to provide for separate channels for the conveyance of welding wire, shielding or cooling gas, electrical power and electric control all in a compact coaxial configuration, such resulting in a lesser diameter cable assembly having superior flexibility with increased life.

Still, one further object of this invention is to provide a welding apparatus having a welding gun assembly, provided with means for easily attaching a nozzle assembly thereto whereupon various sizes of welding wire can be fed through the overall structure.

Another object of this invention is to provide a welding apparatus having a quick connector assembly which is readily operable to supply various sizes of welding wire for considerable savings in time and resultant monetary savings.

One other object of this invention is to provide compact cable connector blocks common to both the welding gun assembly and the quick connector assembly to which a conductor cable can be readily connected to both to achieve electrical continuity therethrough, and to facilitate field repair of the cable assembly, welding gun assembly and quick connector assembly.

One other object of this invention is to provide a semiautomatic welding apparatus which is readily connectable to an existing electric power source and welding wire and gas supply mechanism; provided with a cable assembly having separate channels therein for the conveyance of the required welding wire, electric power and shielding gas; and a welding gun assembly having a control means to semiautomatically supply the electric power, gas and welding wire, while providing a lightweight structure with heat dissipating characteristics.

One further object of this invention is to provide a welding apparatus which is economical to manufacture; lightweight; simple in operation; easily repaired and can be readily connected and disconnected from available electrical, shielding gas, and welding wire supplies.

Various other objects, advantages and features of the invention will become apparent to those skilled in the art from the following discussion, taken in conjunction with the accompanying drawings, in which:

FIG. 1 is a partial sectional view of semiautomatic welding gun apparatus of this invention having portions of a cable assembly illustrated in dotted lines;

FIG. 2 is a cross-sectional view of the cable assembly of the semiautomatic welding apparatus of this invention;

FIG. 3 is a fragmentary exploded perspective view illustrating a nozzle assembly of the welding apparatus of this invention;

FIG. 4 is a fragmentary perspective view illustrating a stepped cross section of the cable assembly of the welding apparatus of this invention;

FIG. 5 is a fragmentary exploded perspective view illustrating a cable connector assembly of the welding apparatus of this invention;

FIG. 6 is a perspective view illustrating an actuator switch assembly of the welding apparatus of this invention;

FIG. 7 is an exploded perspective view illustrating a handle gripper housing of the welding apparatus of this invention;

FIG. 8 is a fragmentary exploded perspective view illustrating a quick connector assembly of the welding apparatus of this invention; and FIG. 9 is a perspective view of a gas diffuser member of the welding apparatus of this invention.

The following is a discussion and description of preferred specific embodiments of the new semiautomatic welding apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a semiautomatic welding gun apparatus of this invention is shown as having portions thereof illustrated in cross section. The welding gun apparatus is readily connectable to a welding wire and gas feed mechanism schematically shown at 250 which is operable on actuation of a control circuit to supply welding wire, electrical power and shielding gas. The welding gun apparatus includes first a supply adapter assembly 14 easily connectable to the welding wire and gas feed mechanism; a quick connector assembly 16 readily connectable to the supply adapter assembly 14; a cable assembly 18 having one end connected to the quick connector assembly 16; and a welding gun assembly 20 connected to the outer end of the cable assembly 18.

As shown in FIG. 1, the supply adapter assembly 14 includes a main support housing 22; a gas feed adapter 24 connected to the support housing 22; a wire feed adapter 26 threadably connected to the support housing 22; and a power cable adapter 28 integral with the support housing 22. The support housing 22 includes a central elongated bore 29 having a gas entrance bore 31 extended laterally from one side thereof and one end of the central bore 29 is provided with internal threads to receive the wire feed adapter 26 therein. The power cable adapter 28 is a laterally extended portion of the support housing 22 and provided with a circular entrance 32 to receive an electrical conductor cable 34 secured against the housing by a pair of ballpoint setscrew members 35 to achieve electrical continuity.

The gas feed adapter 24 is provided with a main connector plug 37 mounted in the gas entrance bore 31 and secured to a hose member 38 to supply the shielding gas to the central bore 29. The wire feed adapter 26 is provided with a feed plug member 39 having a central hole 41 to receive a welding wire 42 within a portion of welding wire conduit 44 as will be explained. The outer end of the feed plug member 39 is provided with a tapered section 46 so as to be mounted within the welding wire and gas feed mechanism. Additionally, the feed plug member 39 is provided with a threaded opening 47 to receive a setscrew 48 so as to clamp the wire conduit 44 therewithin.

As shown in FIG. 1, the support housing 22 is provided with a transversely extended hole 49 intersecting the central bore 29 and adapted to receive a lockpin 51 therethrough so as to securely clamp the quick connector assembly 16 within the central bore 29 in a manner to be described.

As shown in FIGS. 1 and 8, the quick connector assembly 16 is provided with a main connector housing 53; a cable connector block assembly 55; a quick connector plug assembly 56; and a control wire connector assembly 58. The connector housing 53 is formed of a pair of cooperating substantially identical block housing members 59 placed in the clamped relationship as by a pair of cooperating bolt members 60 and sleeve members 61. The outer contour of the connector housing 53 is of an irregular shape having a central portion 63 adapted to be grasped by one's hand and having an upper arcuate portion 65 to receive one's thumb thereagainst for inserting into the supply adapter assembly 14. It is to be noted that the interior of the connector housing 53 is formed with irregular cavities such as a cable cavity 66; a control wire connector assembly cavity 67; and a cable connector block cavity 69.

The cable connector block assembly 55 mounted in the cavity 69 includes first a cable connector block 71 having a separator member 72 therewithin and a lower portion adapted to threadably receive a pair of ballpoint setscrews 73 which have hexagonal socket heads to secure a conductor portion of the cable assembly 18 thereto as will be described. The hexagonal socket head screws have been found very desirable and provide for retightening the connector block assembly with a hexagon wrench passing through holes 17 in connector housing 53, as is also true in connection with the gun end assembly of the welding apparatus as will be seen from the description and discussion hereinafter. The connector block 71 is of a generally rectangular shape having an elongated slot 75 therethrough. The separator member 72 is provided with upper and lower curved surfaces and of a width to fit transversely within the slot 75. The cable connector block 71 and the separator member 72 are constructed of a conductive material such as copper so as to provide electrical continuity outwardly to the welding gun assembly 20.

The quick connector plug assembly 56 includes an elongated connector plug 76 having a welding wire conduit connector member 77 mounted therein and retained by a setscrew 78 and is mountable in the central bore 29 of the support housing 22. The conductor plug 76 includes a gas hose adapter 79 threadably received at one end and having an elongated central opening 81. The connector plug 76 is provided with a groove 83 about the outer end so as to receive the lock pin 51 when in the attached condition as shown in FIG. 1. Additionally, the outer surface of the connector plug 76 is provided with a stepped shoulder 84 to engage the connector block 71 and, rearwardly therefrom, is provided with two O-ring grooves 85 about a central groove 87. A plurality of openings 86 in the central groove 87 conveys the shielding gas from the gas feed adapter 24 to the elongated central opening 81. It is to be noted that O-ring members 89 are mounted within the grooves 85 to provide a gas seal within the central bore 29.

The welding wire conduit connector member 77 is provided with a generally cylindrical head section 91 mounted about the outermost end of the flexible welding wire conduit 44 and having mounted thereabout a heavy neoprene gas seal cover 92 to prevent gas leakage from the elongated central opening 81 into the supply adapter assembly 14. The welding wire conduit 44 is formed of a spiral wire or other material up to the welding gun assembly 20 and surrounded by a covering 94 to seal from the shielding gas which moves thereabout into the welding gun assembly 20. The control wire connector assembly 58 is provided with a tab block member 95 mountable within the control wire connector assembly cavity 67 and having a pair of terminal screws 96 to receive control wires 98 thereon. The tab block member 95 is provided with laterally extended male connectors 101 to receive a connector plug 103 thereupon to provide the control circuit through the control wires 98 to an adapter plug 105.

The cable cavity 66 is of a generally circular shape having a cylindrical groove portion 107 so as to receive a portion of a hose clamp 108 about the innermost end of the cable assembly 18 to secure the same within the connector housing 53 against lateral movement.

As shown in FIGS. 1, 2 and 4, the cable assembly 18 is provided at the connection to the quick connector assembly 16 with an outer heavy shield member 110 so as to limit the flexibility at this point to prevent a rupture of the elements contained therein. The cable assembly 18 includes the welding wire conduit 44 having spaced therefrom a cable insulator and gas hose 112 to form a cavity 114 to convey the shielding gas therethrough. Next, an electrical conductor cable 115 is mounted against the outer surface of the cable insulator and gas hose 112 and provided with the insulated control wires 98 and the outer surface is formed with a heavy insulative cover 117. It is noted that the cable assembly 18 provides separate channels for the various functions of providing welding wire, shielding gas, an electrical conductor, and separate control wires to achieve the semiautomatic operation of this invention as will be explained. The outermost end of the cable assembly 18 is mountable within a heavy cable grommet 119 in the one end of the welding gun assembly 20 so as to provide means to limit bending of the cable assembly 18 to prevent its rupture.

The welding gun assembly 20 includes a main handle assembly 121 uniting the cable assembly 18 internally with a forwardly extended conductor and supply tube assembly 122. The handle assembly 121 is provided with an elongated gripper housing 124; a cable connector assembly 126 mounted within the gripper housing 124; and an actuator switch assembly 127 within the gripper housing 124 connected to the control wires 98.

As shown in FIGS. 1, 2, 4, and 7, the gripper housing 124 is adapted to fit comfortably into one's hand having a pair of half block members 129 united by cooperating bolt 131 and sleeve members 133. The gripper housing 124 forms internal cavity portions 135 to receive the cable assembly 18 and a cable connector cavity 136. The outer end of the cable assembly 18 is first inserted through the cable grommet 119 and having its forward portion surrounded by a hose clamp 138 mounted within a clamp cavity 139 to prevent lateral movement. The control wires 98 are connected to the actuator switch assembly 127 and the electrical conductor 115 is gathered to form a forward extension 141 (FIG. 5) mountable within another one of the cable connector blocks 71.

As shown in FIG. 6, the actuator switch assembly 127 includes a main trigger assembly 143 pivotally mounted on one of the bolts 131 having a main body 145 movable to contact a pair of contact members 146 and 148 to close a circuit through the control wires 98. More particularly, the main body 145 includes an outer grasping section 149 provided with a pair of openings 151 to receive contact screws 152 which are separated by an insulation member 153 and respectively connected to the contact members 146 and 148. The contact member 146 abuts an insulation section 155 of the gripper housing 124 to restrict its upper movement. The trigger assembly 143 includes a lock actuator 156 biased in an outward direction by a spring member 160. It is noted that the grasping of the trigger assembly 143 operates to pivot the same about the support bolt 131 so that the main body 145 contacts the lower contact member 148 to abut the upper contact member 146 for continuity through the control wires 98.

In this actuated position, it is obvious that the lock actuator 156 can be moved backwardly against the force of the spring member 160 to move the lock actuator 156 above an inner portion of the gripper housing 124 to hold the trigger assembly 143 in this actuated condition.

The cable connector assembly 126 is substantially identical to that previously described having the cable connector block 71 provided with a separator member 72 and having a pair of ballpoint setscrews 73 to bind the electrical conductor 141 against the separator member 72 which, in turn, contacts the conductor and supply tube assembly 122.

The conductor and supply tube assembly 122 includes a main tube assembly 166 mounted within the gripper housing 124 having an outer end connected to a nozzle assembly 168. The tube assembly 166 includes a main arcuate tube member 171 having a gas hose adapter 173 threadably secured to the inner end thereof and the outer end is provided with a retainer ring groove 174 and internal and external threads 175 and 177, respectively. Additionally, the arcuate tube member 171 is of electrical conductive material provided with an outer heavy insulated cover 178. The gas hose adapter 173 is of a cylindrical shape having an outer end portion mounted within the cable insulator and gas hose 112 in a sealing manner so as to convey the shielding gas therewithin through the tube assembly 166. The inner end of the tube member 171 is placed within the cable connector block 71 to provide electrical continuity outwardly to the nozzle assembly 168.

The nozzle assembly 168 is provided first with a gas diffuser member 181 threadably mounted within the internal threads 175 on the tube member 171; a contact tip member 183 threadably mounted in the outermost end of the gas diffuser member 181; a nozzle insulator 185 mounted on the external threads 177 of the arcuate tube member 171; and an outer nozzle member 186 mounted about the nozzle insulator 185.

As shown in FIG. 9, the gas diffuser member 181 is provided first with a threaded end section 188 integral with a hexagonal main section 189 having a central opening 191 therethrough. The central opening 191 at the threaded portion is provided with a broached configuration to provide for the flow of the shielding gas about the welding wire conduit 44. The main section 189 is provided with a plurality of laterally extending openings 193 to permit the gas to flow outwardly as shown by the arrows 196 in FIG. 9. One of the openings 193 is provided with internal threads and a setscrew 197 (FIG. 3) to securely anchor the outermost end of the welding wire conduit 44 to the gas diffuser member 181. The outer end of the diffuser member 181 is provided with internal threads to receive the contact tip member 183 therewithin. The contact tip member 183 is also of an electrical conductive material as the gas diffuser member 181 and provided with a central opening 198 to receive the welding wire 42 and provide electrical continuity thereto.

The nozzle insulator 185 is of generally cylindrical shape having a central opening 201 provided at one end with internal threads mounted on the external threads 177 of the arcuate tube member 171. The nozzle insulator 185 is shouldered against a snap ring 203 mounted within the retainer ring groove 174. The outermost end of the central opening 201 is of a diameter larger than the gas diffuser member 181 to permit gas flow thereabout. The outer surface of the nozzle insulator 185 is provided with three-spaced grooves 205, each having a friction retainer ring 207 therein to provide adjustable positioning of the nozzle member 186.

The nozzle member 186 is of multiple stage cylindrical shape having a main section 209 integral through a stepped portion 211 to a tip section 212. The tip section 212 is operable to receive the shielding gas and direct the same in a concentric manner about the contact tip member 183 to provide the proper shielding during welding operations as will be seen.

The nozzle member 186 has been found to be very advantageous in use from the standpoint that it is adjustably located on the nozzle insulator so as to make possible adjustment of the nozzle to provide proper gas shielding for various types of arc characteristics. Further, the rotatability of the nozzle provides for easy cleaning and positioning so as to not use in the same spot all the time.

In the use and operation of the semiautomatic welding apparatus (FIG. 1) of this invention, it is noted that the supply adapter assembly 14 is provided with the wire feed adapter 26 and gas feed adapter 24 connectable to a conventionally available welding wire and gas feed mechanism (not shown). The supply adapter assembly 14 merely plugs into an existing structure and the control adapter plug 105 is thereupon attached to the welding wire and gas feed mechanism to supply the control circuit thereto. Under such conditions, the desired size of welding wire 42 is fed into the wire feed adapter 26. The conductor cable 34 is connected to the power cable adapter 28 by the ballpoint setscrew members 35 to provide electrical continuity. Next, the quick connector assembly 16 is inserted within the central bore 29 of the main support housing 22. On achieving the furthermost movement, the lockpin 51 is mountable within the lockpin hole 49 so as to contact the groove 83 on the connector plug 76 to secure the same against lateral movement. In this condition, the gas feed adapter 24 is operable to supply gas about the central groove 87 of the connector plug 76 so as to move outwardly about the welding wire conduit 44. The cable assembly 18 has the electrical conductor cable 115 securely attached to the cable connector block 71 by the ballpoint setscrews 73. The gas hose 112 sufficiently seals the same to assure that the shielding gas moves outwardly through the cable assembly 18.

The conductor and supply tube assembly 122 is secured in the handle assembly 121 of the welding gun assembly 20 through the use of the ballpoint setscrews 73. It is noted that the ballpoint setscrews 73 pick up the outer end of the conductive cable 115 to provide electrical current outwardly through the arcuate tube member 171, the gas diffuser member 181, and the contact tip member 183 which contacts the welding wire 42 to provide one side of an electrical circuit.

In the welding operation of the semiautomatic welding apparatus (FIG. 1) of this invention, a control circuit is provided through the control wires 98 to the actuator switch assembly 127. On operation of the actuator switch assembly 127, the contacts 146 and 148 are closed to provide a circuit through the control wires 98 to the welding wire and gas feed mechanism (not shown) to concurrently supply the shielding gas, electrical power and welding wire to the welding gun assembly 20. Current is carried from the power supply outwardly through the conductor cable 115 and the nozzle tip member 183 and the item to be welded is connected to the other side of the circuit to achieve arc welding in a conventional manner. The shielding gas is supplied through the cable assembly 18, the central bore of the arcuate tube member 171, about the internal broached structure of the gas diffuser member 181, about the outer surface of the hexagonal portion 189 of the gas diffuser member 181, and about the contact tip member 183. The gas provides a shield about the welding wire 42 as it emerges from the contact tip member 183 and also provides for cooling of the welding gun assembly 20.

It is obvious that the actuator switch assembly 127 is selectively operable to provide a continuous flow of the shielding gas, electrical power and the welding wire 42. It is noted that the gripper housing 134 is of a modern design contour to readily fit into the operator's hand in a comfortable nonfatiguing manner aiding in the determination of the nozzle position.

It is seen that the welding apparatus of this invention provides a lightweight compact structure which can be readily attached to existing welding wire and gas feed mechanisms and operable through a control means to semiautomatically supply the shielding gas and welding wire therethrough. The welding apparatus of this invention provides a means for readily attaching and releasing the same from a supply adapter assembly which is also of lightweight construction for ease of usage. New and novel connector block assemblies are provided to attach to a conductor cable and achieve electrical continuity. Additionally, the semiautomatic welding apparatus of this invention is simple to use; economical to manufacture; provided with features increasing longevity and reducing maintenance; and provided with numerous features for ease of assembly and disassembly for replacement of worn parts and/or defective parts.

While the invention has been described in conjunction with preferred specific embodiments thereof, it will be understood that this description is intended to illustrate and not limit the scope of the invention which is defined by the following claims.

We claim:

1. A welding gun apparatus to supply welding wire, electrical power and shielding gas to a working area, comprising:
   a. a supply adapter assembly connected to a welding wire and gas feed unit,
   b. a quick connector assembly releasably connected to said supply adapter assembly to receive the shielding gas, welding wire, electrical power and a control circuit therefrom,
   c. a cable gun having one end connected to said quick connector assembly to convey the shielding gas, welding wire, electrical power and control circuit within individual chambers, and
   d. a welding gun assembly connected to the outer end of said cable assembly having control means connected to said control circuit selectively operable to semiautomatically feed the welding wire in conjunction with the electrical power and the shielding gas to the working area,
   e. said welding gun assembly including a handle assembly connected to a conductor and supply tube assembly,
   f. said handle assembly having a gripper housing enclosing a power supply connector assembly and an actuator switch assembly, and
   g. said connector assembly having a cable connector block to receive one end of a power supply conductor of said cable assembly and said conductor and supply tube therein, a separator member, and setscrews operable on said power supply conductor and separator member to clamp said power supply conductor and said conductor and supply tube to said connector block for electrical continuity, and
   h. said connector block having an elongated slot therethrough, and said separator member having upper and lower arcuate surfaces which cooperate with said setscrews and power supply conductor and said conductor and supply tube to firmly clamp said power supply conductor and said conductor and supply tube therein for electrical continuity through said conductor and supply tube.

2. A welding gun apparatus as described in claim 1, wherein:
   a. said actuator switch assembly having a trigger member connected to said control circuit to close contact members and simultaneously actuate the welding wire, gas feed unit, and electrical power source, and
   b. said trigger member having a lock actuator biased outwardly by a spring member movable into a latched condition to continuously hold said control circuit in the closed condition to supply the welding wire, electrical power and gas to the working area, and
   c. said lock actuator movable against said spring member and into engagement with said gripper housing to hold said contact members in the closed, actuated condition.

3. A welding gun apparatus as described in claim 1, wherein:
   a. said conductor and supply tube assembly including a tube assembly connected to a nozzle assembly,
   b. said tube assembly having a tube member mounted in said cable connector block so as to conduct current, shielding gas and welding wire conduit therethrough, and
   c. said nozzle assembly including a gas diffuser member secured to the outer end of said tube member, a contact tip secured to said diffuser member to train the welding wire therethrough, an insulator member mounted about said diffuser member, and a nozzle member adjustable mounted about said insulator member to direct the shielding gas about the periphery of said contact tip to provide proper welding arc shielding, and d. said gas diffuser member having an outermost surface of hexagonal shape transverse cross section with an entrance end provided with a spaced opening about the periphery of said welding wire conduit and radially positioned openings to direct gas flow outwardly and then forwardly about said hexagonal surface and about a discharge end of said gas diffuser so as to surround said contact tip during welding operations.

4. In a welding gun apparatus including, a supply adapter assembly connected to a welding wire and gas feed mechanism, and electrical power source, a connector assembly connected to said supply adapter assembly, a cable assembly connected at one end to said connector assembly, and a welding gun assembly connected to the other end of said cable assembly, the improvement which comprises:

a. said connector assembly includes a connector block, a connector plug, a separator member mounted in said connector block having arcuate upper and lower surfaces conforming in shape to the outer surface of said connector plug, and setscrews mounted in said connector block, b. said connector block having an opening therethrough to receive said connector plug and a portion of a connector cable from said cable assembly therein, and c. said setscrews operable to bind along the entire length of said separator member said conductor cable to said separator member which, in turn, binds said connector plug to said separator member and said connector block.

* * * * *

UNITED STATES PATENT OFFICE
CERTIFICATE OF CORRECTION

Patent No. 3,629,547        Dated December 21, 1971

Inventor(s)  Jack R. Kester, et al

It is certified that error appears in the above-identified patent and that said Letters Patent are hereby corrected as shown below:

Column 4, line 56, "conductor" should read -- connector --. Column 7, line 62, "134" should read -- 124 --. Column 8, line 21, "gun" should read -- assembly --.

Signed and sealed this 17th day of October 1972.

(SEAL)
Attest:

EDWARD M. FLETCHER, JR.
Attesting Officer

ROBERT GOTTSCHALK
Commissioner of Patents